US008162330B2

(12) United States Patent
Melkumyan et al.

(10) Patent No.: US 8,162,330 B2
(45) Date of Patent: Apr. 24, 2012

(54) MULTI-PURPOSE MOBILE CART

(76) Inventors: Ashot Melkumyan, Montebello, CA (US); Karapet Kozloyan, Montebello, CA (US)

(*) Notice: Subject to any disclaimer, the term of this patent is extended or adjusted under 35 U.S.C. 154(b) by 671 days.

(21) Appl. No.: 12/221,111

(22) Filed: Jul. 31, 2008

(65) Prior Publication Data
US 2010/0026151 A1 Feb. 4, 2010

(51) Int. Cl.
*B62B 3/00* (2006.01)
*B62B 1/00* (2006.01)
*A47B 88/00* (2006.01)

(52) U.S. Cl. ............... 280/47.34; 280/47.35; 280/79.11; 280/79.3; 280/651; 312/249.8; 312/249.11; 312/311; 312/330.1

(58) Field of Classification Search ............... 280/47.17, 280/47.19, 47.26, 47.34, 47.35, 79.11, 79.2, 280/79.3, 638, 35, 639, 651; 312/249.1, 312/249.8, 249.11, 330.1, 311
See application file for complete search history.

(56) References Cited

U.S. PATENT DOCUMENTS

| | | | | |
|---|---|---|---|---|
| 1,857,716 A * | 5/1932 | Farrell et al. | | 312/7.1 |
| 2,845,780 A * | 8/1958 | Conklin et al. | | 62/291 |
| D185,956 S * | 8/1959 | Wright et al. | | D34/17 |
| D299,345 S | 1/1989 | Foy et al. | | |
| 4,936,594 A * | 6/1990 | Oliver, III | | 280/47.19 |
| D310,529 S | 9/1990 | Yuen | | |
| D311,080 S * | 10/1990 | Arnott et al. | | D34/21 |
| 4,989,291 A | 2/1991 | Parent | | |
| 5,224,531 A | 7/1993 | Blohm | | |
| 5,314,243 A * | 5/1994 | McDonald et al. | | 312/215 |
| 5,480,224 A * | 1/1996 | Ugalde | | 312/194 |
| 5,611,553 A * | 3/1997 | Schoeman et al. | | 280/47.35 |
| 5,634,649 A * | 6/1997 | Breining et al. | | 280/47.35 |
| 5,741,053 A * | 4/1998 | Nielsen | | 312/194 |
| 5,765,842 A * | 6/1998 | Phaneuf et al. | | 280/47.35 |
| 5,913,582 A * | 6/1999 | Coonan | | 312/223.3 |
| 6,170,839 B1 | 1/2001 | Kizewski | | |
| 6,315,308 B1 * | 11/2001 | Konopka | | 280/47.35 |
| D465,895 S | 11/2002 | Pfefferle et al. | | |
| 6,474,760 B2 * | 11/2002 | Rauls | | 312/330.1 |
| 7,278,644 B2 * | 10/2007 | Villarreal | | 280/47.26 |
| 7,325,891 B1 * | 2/2008 | Kinsley et al. | | 312/257.1 |
| 2003/0141687 A1 * | 7/2003 | Wixted et al. | | 280/47.35 |
| 2003/0184035 A1 * | 10/2003 | Yu | | 280/47.35 |
| 2005/0242534 A1 * | 11/2005 | Woods et al. | | 280/47.34 |
| 2006/0055135 A1 * | 3/2006 | Tracewell et al. | | 280/47.35 |
| 2007/0029746 A1 * | 2/2007 | Brennan, Jr. | | 280/47.26 |
| 2007/0145699 A1 * | 6/2007 | Robbins et al. | | 280/47.26 |
| 2007/0228680 A1 * | 10/2007 | Reppert et al. | | 280/47.35 |
| 2008/0164791 A1 * | 7/2008 | Parise et al. | | 312/249.1 |
| 2009/0212518 A1 * | 8/2009 | Bustle et al. | | 280/47.35 |
| 2009/0261549 A1 * | 10/2009 | Kral | | 280/47.35 |
| 2009/0295110 A1 * | 12/2009 | Wilsher | | 280/47.35 |

* cited by examiner

*Primary Examiner* — John R Olszewski
(74) *Attorney, Agent, or Firm* — TL Garrett, PLC; Tanya L. Garrett

(57) ABSTRACT

A Multi-Purpose Mobile Cart including a tool chest adapted to hold tools, a computer system for executing computer executable programs, a plurality of electrical devices, and a plurality of speakers; a computer system for executing computer executable programs including a monitor for viewing images, a computer hard drive for storing data and programs, a keyboard adapted to input information into the computer system, and a mouse adapted to provide a user interface with the computer system; a plurality of electrical devices adapted to provide reception and amplification of radio or television signals and further adapted to provide playback of media; and a plurality of speakers, the plurality of speakers adapted to provide audio output from the computer system and the plurality of electrical devices.

8 Claims, 3 Drawing Sheets

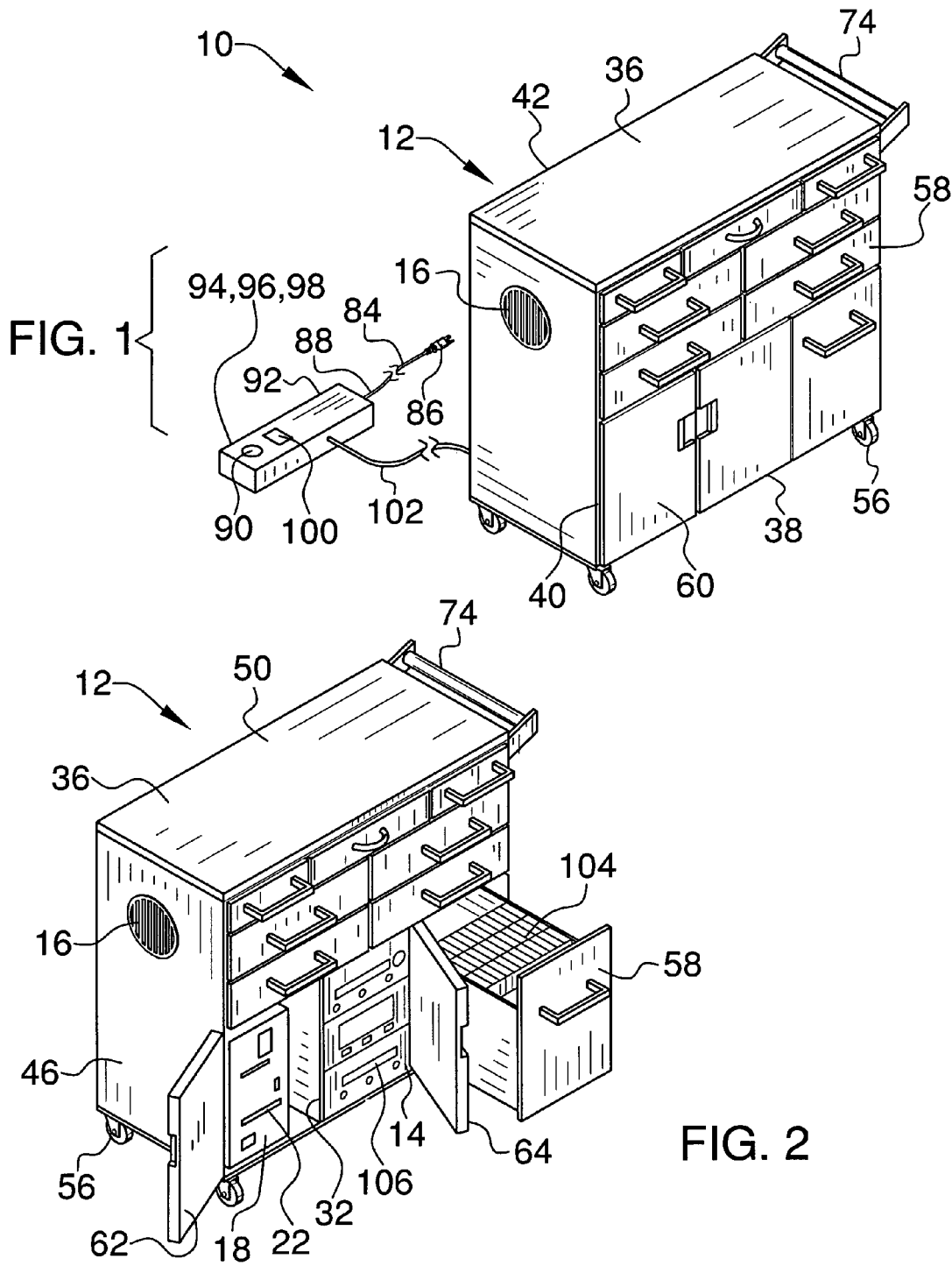

MULTI-PURPOSE MOBILE CART

FIELD OF THE INVENTION

The present invention generally relates to a tool chest, and more particularly to a tool chest having a computer system and mobile entertainment center adapted to be used in professional or home garage and workshop applications.

BACKGROUND

Garages are no longer just for storing cars and tools. Homeowners are constantly looking for ways to utilize unused space, organize, and beautify their garages and to make time spent in the garage as pleasant as possible. Being able to access the internet without leaving the comfort of the garage, listening to music, or watching television makes time in the garage productive and entertaining.

Devices relating to portable carts are disclosed in U.S. Pat. No. 5,224,531 issued in the name of Blohm, U.S. Pat. No. 4,989,291 issued in the name of Parent, U.S. Pat. No. 6,170,839 issued in the name of Kizewski, U.S. Pat. No. D310,529 issued in the name of Yuen, U.S. Pat. No. D299,345 issued in the name of Foy et al., U.S. Pat. No. D465,895 issued in the name of Pfefferle et al., U.S. Pat. No. D311,080 issued in the name of Arnotte et al., and U.S. Pat. No. 4,936,594 issued in the name of Oliver, III.

While existing devices suit their intended purposes, the need remains for a device that combines tool storage with computing equipment and audio and video equipment.

SUMMARY

A Multi-Purpose Mobile Cart including a tool chest adapted to hold tools, a computer system for executing computer executable programs, a plurality of electrical devices, and a plurality of speakers; a computer system for executing computer executable programs including a monitor for viewing images, a computer hard drive for storing data and programs, a keyboard adapted to input information into the computer system, and a mouse adapted to provide a user interface with the computer system; a plurality of electrical devices adapted to provide reception and amplification of radio or television signals and further adapted to provide playback of media; and a plurality of speakers, the plurality of speakers adapted to provide audio output from the computer system and the plurality of electrical devices.

BRIEF DESCRIPTION OF THE DRAWINGS

These and other objects, features and advantages of the present invention will become apparent from the following detailed description and the appended drawings in which:

FIG. 1 illustrates a perspective view of a Multi-Purpose Mobile Cart in a storage mode with the power supply/surge protector shown and proximal end speaker shown in accordance with an embodiment of the invention.

FIG. 2 illustrates a perspective view of a Multi-Purpose Mobile Cart having the lowest storage spaces open and the computer hard drive storage area shown in accordance with an embodiment of the invention.

DETAILED DESCRIPTION OF THE INVENTION

Several embodiments of the Multi-Purpose Mobile Cart are illustrated in each of FIGS. 1-5 wherein like numerals represent like parts. Like numerals also represent like parts throughout this written description.

Figure 3:
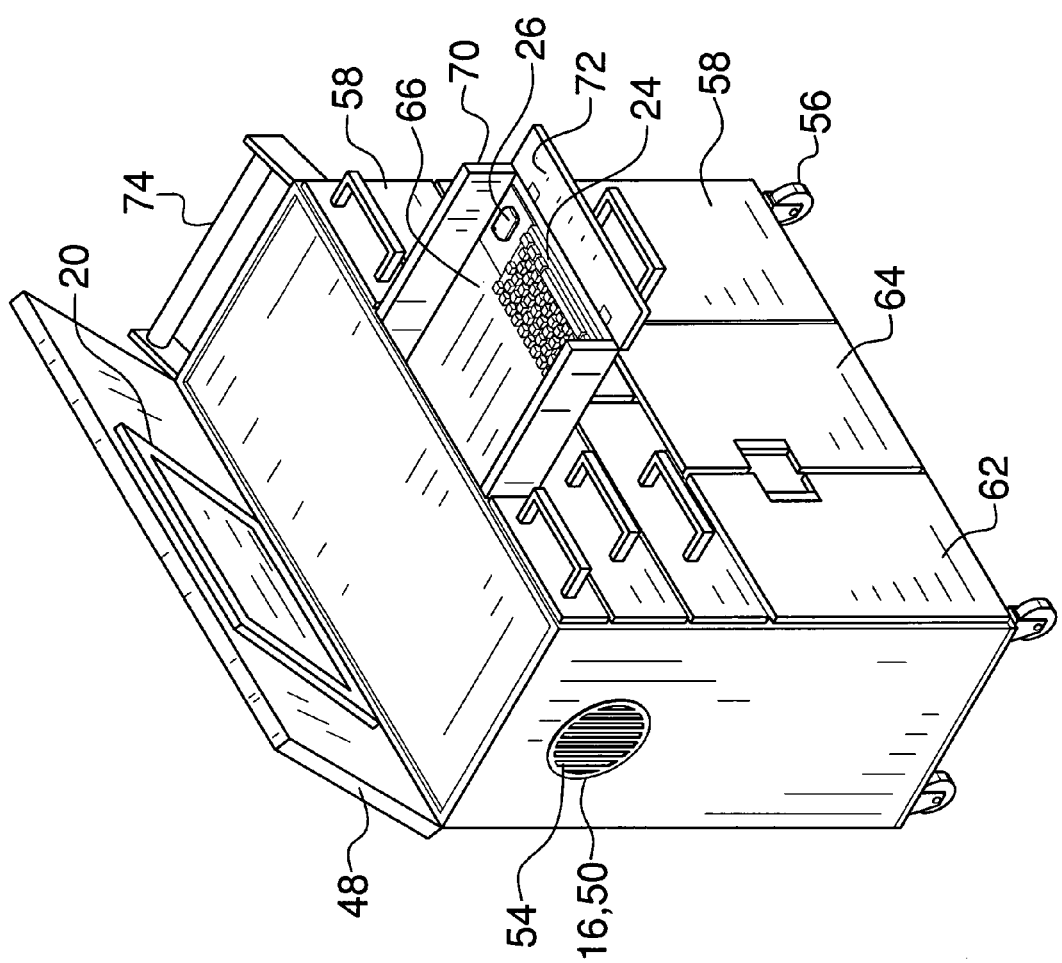
FIG. 3 illustrates a perspective view of a Multi-Purpose Mobile Cart having the keyboard in an extended position and a flip-up panel in open position in accordance with an embodiment of the invention.

In an embodiment of the invention illustrated in FIGS. 1-3, a Multi-Purpose Mobile Cart 10 is provided. Generally, the Multi-Purpose Mobile Cart 10 includes a tool chest 12 adapted to hold tools, a plurality of electrical devices 14, and a plurality of speakers 16; a computer system 18 for executing computer executable programs including a monitor 20 for viewing images, a computer hard drive 22 for storing data and programs, a keyboard 24 adapted to input information into the computer system 18, and a mouse 26 adapted to provide a user interface with the computer system 18; a plurality of electrical devices 14 adapted to provide reception and amplification of radio or television signals and further adapted to provide playback of media; and a plurality of speakers 16, the plurality of speakers 16 adapted to provide audio output from the computer system 18 and the plurality of electrical devices 14.

In one embodiment of the invention, the tool chest 12 includes a frame 32. The frame 32 may be formed from a plurality of tubular members 34, the tubular members 34 including a peripheral wall and a hollow cross-section, the hollow cross-section defined by the peripheral wall. The tubular members 34 may be joined by any suitable means such that the tubular members 34 are retained in a desired position and provide the requisite structural rigidity necessary to support the weight of the tool chest 12 and the items stored within and affixed thereto.

In one embodiment of the invention, the frame 32 may be formed from rigid materials, examples of which include, but are not limited to: steel, aluminum, plastics, and composite materials. Other suitable materials from which the frame 32 may be formed may be readily apparent to a skilled artisan.

The tool chest 12 may include a generally rectangular shape and is defined by six sides, the six sides including a top side 36, a bottom side 38 opposite the top side 36, a front side 40, a rear side 42 opposite the front side 40, a left side 44, and a right side 46 opposite the left side 44.

In an embodiment of the invention including a frame 32, the frame 32 may operate to define the shape of the tool chest 12 and provide a plurality of surfaces adapted to receive the six sides. In this embodiment of the invention, each respective side is placed in secure mechanical engagement with the frame 32, whereby the side is permanently affixed to the frame 32.

In another embodiment of the invention, the tool chest 12 does not include a frame 32, but rather, each of the respective six sides cooperates with the other sides to both define the shape of the tool chest 12 and to provide the structural strength required to support the tool chest 12 and the contents of the tool chest 12.

In one embodiment of the invention, each of the respective sides may be formed such that the side includes a generally rectangular form, with each having associated dimensions corresponding to length, width, and thickness.

In one embodiment of the invention, each of the respective sides may be formed from any material providing sufficient rigidity to provide desired levels of durability and rigidity. Examples of suitable materials for the sides of the tool chest 12 may include, but are not limited to: metal, plastics, and composite materials.

In one embodiment of the invention, the top side 36 may include a pivoting cover 48 that operates to provide a planar work area 50 when the pivoting cover 48 is in the closed position as illustrated in FIGS. 1 and 2.

The pivoting cover 48 may be hingably affixed to the top side 36 by way of a hinge, whereby the pivoting cover 48 may pivot about the axis of the hinge, allowing the pivoting cover 48 to move from a closed position to an open position, and from an open position to a closed position.

In one embodiment of the invention, the pivoting cover 48 is also adapted to provide a secure cover for the monitor 20 when the monitor 20 is not in a viewing position. The pivoting cover 48 may also be placed in an open position wherein the pivoting cover 48 exposes the monitor 20.

In another embodiment of the invention, the monitor 20 may be securably affixed to the pivoting cover 48, as illustrated in FIG. 3. In an embodiment of the invention including the monitor 20 affixed to the pivoting cover 48, the pivoting cover 48 may be placed in an open position, whereby the monitor 20 is placed in an orientation that permits the monitor 20 to be viewed.

In one embodiment of the invention, each of the left and right sides 44,46 may include an opening 52, the opening 52 corresponding in shape to the shape of a speaker such that the opening 52 cooperates with a plurality of fasteners 54 to securely retain the speaker therein.

In another embodiment of the invention, the bottom side 38 may be adapted to receive a plurality of casters 56 thereupon, as illustrated in FIGS. 1-5. The casters 56 may be affixed thereto by any suitable means of attachment, the means of attachment may include, but are not limited to: screws, bolts, and welds. The casters 56 and bottom side 38 cooperate to allow the tool chest 12 to be rolled to a desired position.

In one embodiment of the invention, the front side 40 is adapted to receive a plurality of sliding drawers 58, as illustrated in FIGS. 1 and 2. A sliding drawer is disclosed in U.S. Pat. No. 4,070,076 issued in the name of Zwillinger, which is hereby incorporated herein in its entirety. Each of the sliding drawers 58 may be slidingly affixed to either the frame 32 or at least one of the six sides.

In another embodiment of the invention, the front side 40 may include a plurality of cabinet doors 60, each of the cabinet doors hingably affixed to the front side 40 of the cabinet and operating to swing outwardly therefrom, thereby providing a storage space.

In one embodiment of the invention, a first access door 62 providing access to the computer system 18 and a second access door 64 providing access to a plurality of electrical devices 14. Each of the first and second access doors 62,64 are shown in the open position in FIG. 2 and are shown in the closed position in FIG. 1.

In one embodiment of the invention, each of the first and second access doors 62,64 may be located nearer the bottom side 38 than the top side 36 of the tool chest 12.

In one embodiment of the invention, an extendable drawer 66 may be included. The extendable drawer 66 may be adapted to receive each of a computer keyboard 24 and a computer mouse 26 therein. The extendable drawer 66 is shown in an extended position in FIG. 3 and is shown in a closed position in FIGS. 1 and 2.

In one embodiment of the invention, the extendable drawer 66 may include a bottom 68, two opposing sides 70, a rear face (not shown), and a pivoting front face 72. The pivoting front face 72 may be hingably affixed to the bottom 68, such that the pivoting front face 72 may pivot about a hinge axis, allowing the pivoting front face 72 to move independently of the extendable drawer 66. The pivoting front face 72 may provide a user access to a keyboard 24 or mouse 26 disposed within the extendable drawer 66 by providing a convenient place for a user to rest the user's wrist while manipulating the keyboard 24 or mouse 26, as illustrated in FIG. 3.

In another embodiment of the invention, the extendable drawer 66 does not include a pivoting front face 72, but rather includes a front face that is securably fixed to both the bottom 68 and the opposing sides 70 of the extendable drawer 66, such that the front face may not move independently of the extendable drawer 66.

In one embodiment of the invention, a handle 74 may be attached to the top side 36 of the tool chest 12 and may provide a convenient place for a user to grasp, thereby providing a means for the user to easily move the tool chest 12 from one location to another.

In one embodiment of the invention, the rear side 42 includes an opening 76 adapted to allow at least one cable 78 to pass therethrough. The opening 76 in the rear side 42 is of a sufficient size to allow the at least one cable 78 to pass therethrough without binding, rubbing, or interfering with the cable 78.

In another embodiment of the invention, the rear side 42 includes an opening 76 of sufficient size to allow a strain-relief device 80 to be mounted therein. The strain-relief device 80 operates to transfer any force applied to a cable 78 from the cable 78 to the tool chest 12, eliminating damage to electrical connections formed with the cable 78.

In one embodiment of the invention, the cable 78 may provide electrical power to each of the plurality of electrical devices 14 disposed within the tool chest 12. The cable 78 may operate to place each of the electrical devices 14 in electrical communication with an electrical power outlet or similar electrical power source.

In an embodiment of the invention, the cable 78 includes a first cable end 84, the first cable end 84 including a suitable electrical connection 86 for placing the cable 78 in electrical communication with an electrical power source; and a second cable end 88, the second cable end 88 adapted to be placed in electrical communication with a main power disconnect 90, the main power disconnect 90 operating to selectively couple or decouple the electrical devices 14 within the tool chest 12 from the power conducted by the cable 78.

In another embodiment of the invention, the electricity conducted by the cable 78 may first pass through the main power disconnect 90 and be conducted therefrom to a power distribution block 92. The power distribution block 92 may operate to provide a plurality of electrical connection points, whereby each electrical device 14 disposed within the tool chest 12 may be placed in electrical communication with the cable 78 by connection thereto.

In one embodiment of the invention, the power distribution block 92 may include a transformer 94, the transformer 94 operating to transform the electrical energy provided from the electrical power source to a type of electrical energy required by the electrical devices 14 disposed within the tool chest 12. The transformer 94 may operate to transform three-phase electrical power to single-phase electrical power, to transform high-voltage electrical power to a lower voltage electrical power, to transform low-voltage electrical power to high-voltage electrical power, to transform power of a given voltage to the same voltage, thereby acting as an audio transformer, or any combination thereof.

In another embodiment of the invention, the power distribution block 92 may include a converter 96 for converting alternating-current electrical power to direct-current electrical power.

In another embodiment of the invention, the power distribution block 92 may include an inverter 98 for converting direct-current electrical power to alternating-current electrical power.

In another embodiment of the invention, the power distribution block 92 includes a ground fault circuit interrupt ("GFCI") 100 to reduce the risk of a short circuit from water or other shop hazards. A GFCI is disclosed in U.S. Pat. No. 5,600,524, issued in the name of Neiger et al., and incorporated herein in its entirety.

In an embodiment of the invention, each electrical device 14 includes associated power cords 102, the associated power cords 102 adapted to place each respective electrical device 14 in electrical communication with the power distribution block 92.

In one embodiment of the invention, the associated power cords 102 may be routed from each respective electrical device 14 to the power distribution block by way of the tubular members 34 forming the frame 32. The hollow cross-section of each respective tubular member 34 may operate as a conduit, allowing the associated power cords 102 to pass therethrough, thereby protecting each respective power cord 102 from damage and environmental exposure.

In one embodiment of the invention, at least one fan 104 may be disposed within the tool chest 12, the at least one fan 104 operating to provide cooling for each respective electrical device 14 by circulating air within the tool chest 12.

In another embodiment of the invention, the fan 104 may operate to draw air from outside the tool chest 12 into the tool chest 12, thereby providing air that may be cooler than the ambient air in the tool chest 12, whereby increased cooling may be provided to the electrical devices 14.

In another embodiment of the invention, the fan 104 may operate to expel air heated by the cooling of the electrical devices 14 from within the tool chest 12, and concurrently draw air from the exterior of the tool chest 12, with the air from the exterior being cooler than the heated air expelled therefrom.

In one embodiment of the invention, each of the electrical devices 14 may include an associated device face 106, with each respective device face 106 including controls for the electrical device 14 with which the device face 106 is associated.

In one embodiment of the invention, each electrical device 14 may be oriented within the tool chest 12 such that the device face 106 of each respective electrical device 14 is oriented in such a way as to allow a user to easily access the controls included thereupon.

In an embodiment of the invention, the plurality of electrical devices 14 may be oriented such that each respective device face 106 is oriented toward the first access door 62, thus providing a user easy access to each respective electrical device 14 when the first access door 62 is in the open position.

In an embodiment of the invention, one or more electrical devices 14 may cooperate to: provide reception and amplification of AM, FM, television, or satellite radio audio signals; provide playback of compact discs, computer media files including, but not limited to MP3 and WAV formats, digital video discs or high-definition video discs, or other recorded media; provide connection and display of cable television signals, satellite television signals, and high-definition (HD) broadcast television signals.

In another embodiment of the invention, the plurality of electrical devices 14 may include a computer system 18. The computer system 18 may generally include writable memory, at least one processor, a monitor 20, and at least one input device. The computer system 18 may also include a modem, the modem operating to connect the computer system 18 to the internet.

In another embodiment of the invention, the computer system 18 may include means for connecting to a local area network, or to a wireless network.

In one embodiment of the invention, the electrical devices 14 may include associated antennas (not shown). In this embodiment of the invention, the associated antennas may protrude outwardly from the back side of the tool chest 12 and be mounted thereto.

In another embodiment of the invention, the tool chest 12 may include a microwave oven compartment adapted to receive a microwave oven 108 for heating food. The microwave oven 108 may include a hinged door 110. The microwave oven 108 may be oriented with respect to the tool chest 12 such that a user may easily access the microwave oven 108 and the hinged door 110 of the microwave oven 108. A tool chest 12 including a microwave oven 108 is illustrated in FIGS. 4 and 5.

In one embodiment of the invention, the tool chest 12 may include a refrigerator compartment adapted to receive a refrigerator 112 for keeping items such as food and beverages cool. The refrigerator 112 may include at least one associated hinged door 114.

In another embodiment of the invention, the refrigerator 112 may include a freezer 116 for keeping items frozen. The freezer 116 may be accessed via the at least one hinged door 114 of the refrigerator 112.

Figures 4, 5:
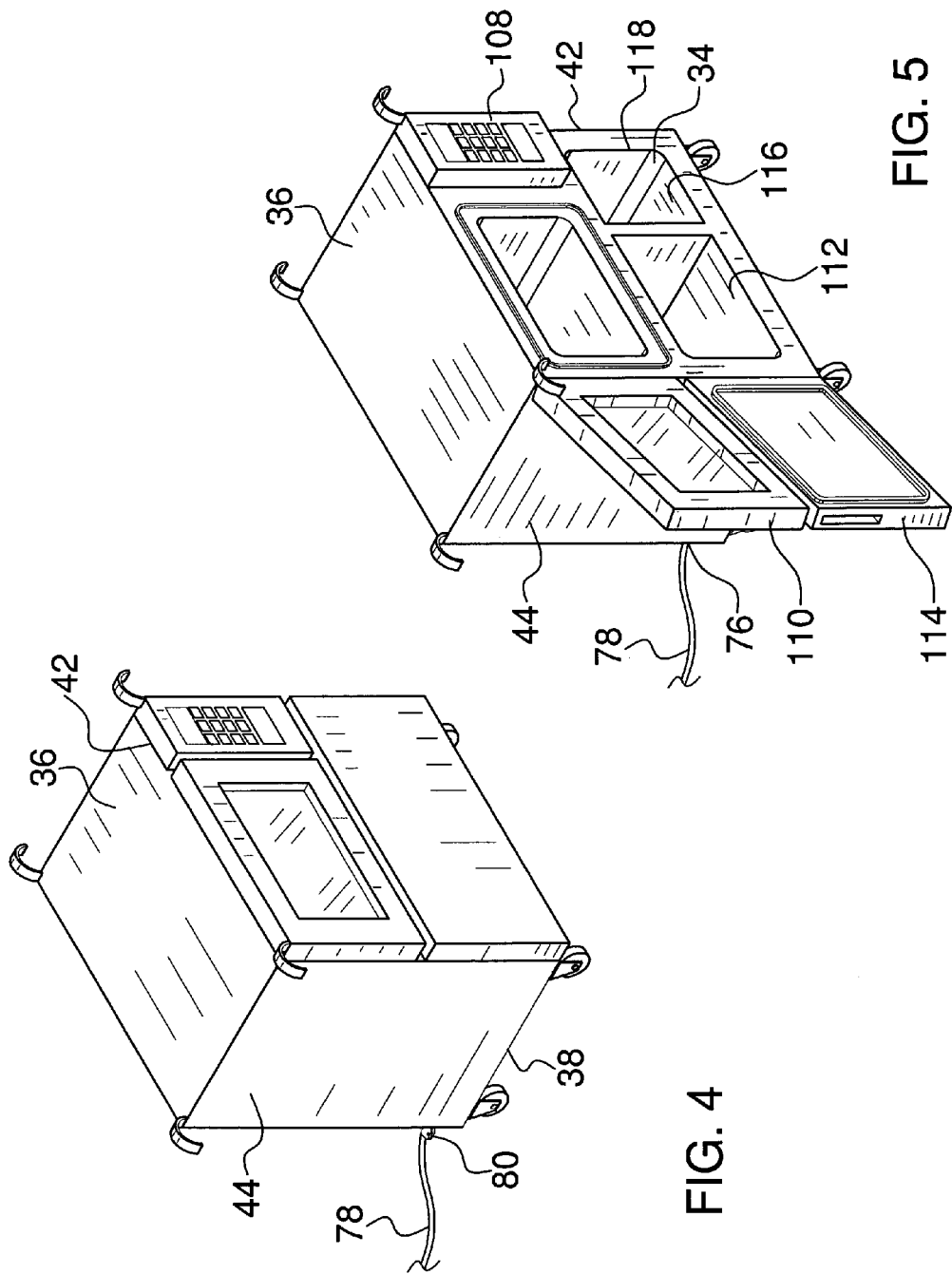
FIG. 4 illustrates a perspective view of a rear side of a Multi-Purpose Mobile Cart including a microwave oven and a refrigerator in accordance with an embodiment of the invention.
FIG. 5 illustrates a perspective view of a rear side of a Multi-Purpose Mobile Cart having a microwave oven and a refrigerator, with each of the microwave oven and the refrigerator having the respective doors of each in the open position in accordance with an embodiment of the invention.

As shown in FIGS. 4 and 5, the tool chest 12 may include openings 118 defined in at least one side that operate to provide access to each of the microwave oven and the refrigerator.

As illustrated in FIGS. 4 and 5, the openings 118 may be defined in the rear side 42 of the tool chest 12. The openings 118 being defined in the rear side 42 of the tool chest 12 permit each of the microwave 110 and refrigerator 112 to be oriented such the each of a microwave oven door 110 and a refrigerator door 114 open from rear side 42 of the tool chest 12.

A microwave oven door 110 is shown in the open position in FIG. 5 and in the closed position in FIG. 4. A refrigerator door 114 is shown in the open position in FIG. 5 and in the closed position in FIG. 4.

In one embodiment of the invention, each of the microwave oven 108 and refrigerator 112 may be fixably secured to the tool chest 12 by being placed in mechanical engagement therewith by mechanical fasteners, brackets, or adhesives.

In another embodiment of the invention, each of the microwave oven 108 and refrigerator 112 may be removably housed within the tool chest 12 such that each of the microwave oven 108 and the refrigerator 112 may be easily removed therefrom.

While several aspects have been presented in the foregoing detailed description, it should be understood that a vast number of variations exist and these aspects are merely an example, and it is not intended to limit the scope, applicability, or configuration of the invention in any way. Rather, the foregoing detailed description provides those of ordinary skill in the art with a convenient guide for implementing a desired aspect of the invention and various changes can be made in the function and arrangements of the aspects of the technology without departing from the spirit and scope of the appended claims.

What is claimed is:

1. A Multi-Purpose Mobile Cart, comprising:
a tool chest formed of metal adapted to hold tools including
a frame,
a generally rectangular-shape defined by six sides, the six sides including
a top side,
a bottom side opposite the top side, wherein the bottom side is adapted to receive a plurality of casters thereupon, whereby the casters and bottom side cooperate to allow the tool chest to be rolled to a desired position,
a front side including a plurality of cabinet doors, each of the cabinet doors hingably affixed to the front side of the tool chest and operating to swing outwardly therefrom, thereby providing a storage space, wherein the cabinet doors further include
a first access door providing access to the computer system, and
a second access door providing access to a plurality of electrical devices,
a rear side opposite the front side, wherein the rear side further includes
an opening adapted to allow at least one cable to pass therethrough, and wherein the opening in the back side is of a sufficient size to allow the at least one cable to pass therethrough without binding, rubbing, or interfering with the cable,
a left side, and
a right side opposite the left side;
a pivoting cover, the pivoting cover hingably affixed to the top side by a hinge and adapted to pivot about the axis of a hinge, whereby the pivoting cover may move from a closed position to an open position, and from an open position to a closed position, thereby providing a planar work area and a secure cover for the monitor when the pivoting cover is in a closed position;
an extendable drawer, the extendable drawer adapted to receive each of a computer keyboard and a computer mouse therein, wherein the extendable drawer includes
a bottom,
two opposing sides,
a rear face, and
a pivoting front face, the pivoting front face hingably affixed to the bottom, such that the pivoting front face may pivot about a hinge axis, allowing the pivoting front face to move independently of the extendable drawer;
a computer system for executing computer executable programs;
a plurality of electrical devices adapted and cooperating to
provide reception and amplification of AM, FM, television, or satellite radio audio signals,
provide playback of media,
provide playback of compact discs, computer media files including, but not limited to MP3 and WAV formats, digital video discs or high-definition video discs, or other recorded media,
provide connection and display of cable television signals, satellite television signals, and high-definition (HD) broadcast television signals; a plurality of speakers, the plurality of speakers adapted to provide audio output from the computer system and the plurality of electrical devices; and
a power distribution block including
a transformer, the transformer operating to transform the electrical energy provided from the electrical power source to a type of electrical energy required by the electrical devices disposed within the tool chest, wherein the transformer operates to transform three-phase electrical power to single-phase electrical power, to transform high-voltage electrical power to a lower voltage electrical power, to transform low-voltage electrical power to high-voltage electrical power, or to transform power of a given voltage to the same voltage, thereby acting as an audio transformer,
a converter for converting alternating-current electrical power to direct-current electrical power; an inverter for converting direct-current electrical power to alternating-current electrical power, and
a ground fault circuit interrupt ("GFCI") that operates to reduce the risk of a short circuit from water or other shop hazards.

2. The Multi-Purpose Mobile Cart of claim 1, wherein each of the sides and the frame is formed from metal.

3. The Multi-Purpose Mobile Cart of claim 1, wherein each of the left and right sides include an opening, the opening corresponding in shape to the shape of a speaker such that the opening cooperates with a plurality of fasteners to securely retain the speaker therein.

4. The Multi-Purpose Mobile Cart of claim 1, further comprising:
a plurality of sliding drawers, each of the sliding drawers slidingly affixed to at least one of the six sides.

5. The Multi-Purpose Mobile Cart of claim 1, wherein the cable provides electrical power to each of a plurality of electrical devices disposed within the tool chest, and wherein the cable operates to place each of the plurality of electrical devices in electrical communication with an electrical power source.

6. The Multi-Purpose Mobile Cart of claim 5, further comprising:
a first cable end, the first cable end including a suitable electrical connection for placing the cable in electrical communication with an electrical power source; and
a second cable end, the second cable end adapted to be placed in electrical communication with a main power disconnect, the main power disconnect operating to selectively couple or decouple the electrical devices within the tool chest from the power conducted by the cable; and
wherein the power distribution block operating to provide a plurality of electrical connection points, whereby each electrical device disposed within the tool chest is placed in electrical communication with the cable by connection thereto.

7. The Multi-Purpose Mobile Cart of claim 1, wherein the computer system further comprises:
a monitor for viewing,
a computer hard drive for storing data and programs,
a keyboard adapted to input information into the computer system,
a mouse adapted to provide a user interface with the computer system; and
means for connecting to the internet.

8. The Multi-Purpose Mobile Cart of claim 1, further comprising: a microwave oven compartment adapted to receive a microwave oven;

a microwave oven for heating food, the microwave including a hinged door and oriented with respect to the tool chest such that a user may easily access the microwave oven and the hinged door of the microwave oven;

a refrigerator compartment adapted to receive a refrigerator;

a refrigerator for keeping items such as food and beverages cool, the refrigerator including at least one associated hinged door;

a freezer for keeping items frozen, the freezer accessed via~ the at least one hinged door of the refrigerator; and a plurality of openings defined in at least one side that operate to provide access to each of the microwave oven and the refrigerator.

\* \* \* \* \*